United States Patent [19]

Pongrass et al.

[11] 4,421,297
[45] Dec. 20, 1983

[54] SELF-CLOSING FLUID DISPENSING VALVES

[76] Inventors: Robert G. Pongrass, #2A Bulkara Rd., Bellevue Hill, New South Wales, Australia; Christopher C. Rutter, 24174 Dover La., Hayward, Calif. 94541

[21] Appl. No.: 317,060

[22] Filed: Nov. 2, 1981

[51] Int. Cl.³ .............................................. F16K 5/00
[52] U.S. Cl. .................................. 251/310; 251/313; 251/345; 251/348; 222/516; 222/553
[58] Field of Search .............. 251/310, 313, 345, 348, 251/352, 354, 336; 222/553, 83.5, 88, 516; 137/801; 239/538, 569, 581

[56] References Cited

U.S. PATENT DOCUMENTS

| 697,109 | 4/1902 | Strong | 251/345 |
| 1,272,950 | 7/1918 | Hawkins | 251/348 |
| 3,561,487 | 2/1971 | Reed, Jr. | 251/310 X |

FOREIGN PATENT DOCUMENTS 407456 11/1971 Australia ................................. 251/345

Primary Examiner—Martin P. Schwadron
Assistant Examiner—Sheri Novack
Attorney, Agent, or Firm—Linval B. Castle

[57] ABSTRACT

Self-closing fluid dispensing valves particularly for use with soft flexible fluid containers. The valves include a tubular outer housing having one end attached to the fluid container and an inner coaxial tubular barrel which may be rotated to align fluid dispensing holes in both housing and barrel. Tabs extending from both housing and barrel permit "two-finger" opening of the valves against spring forces that operate to automatically close the valves.

3 Claims, 14 Drawing Figures

SELF-CLOSING FLUID DISPENSING VALVES

CROSS-REFERENCE TO RELATED APPLICATIONS

The invention described and claimed herein is related to those inventions disclosed in copending patent applications Ser. No. 141,068, filed Apr. 17, 1980, now U.S. Pat. No. 4,322,018, and Ser. No. 225,788, filed Jan. 16, 1981, now U.S. Pat. No. 4,355,739.

BRIEF SUMMARY OF THE INVENTION

This invention relates to fluid dispensing valves and particularly to self-closing valves which are readily operable by two fingers of one hand.

While useful with any type of fluid dispenser, the valves disclosed herein are valuable for use on portable fluid containers which may be carried in one hand while the other hand can manipulate the dispensing valve. Dispensing valves to be disclosed are particularly valuable for the use on flexible fluid containers such as the laminated plastic film containers, the popular "BOTA BAG" wine flasks, or any other type of soft container whose entire valve assembly may readily twist during attempts to open and close the valve.

Several embodiments of the valves are disclosed. All are basically similar in that coaxial housing and barrel sections are rotated with respect to each other to align normally offset dispensing openings to permit the fluid to flow through the barrel and openings. Each embodiment includes radial tabs or wings attached to the housing by opposing pressures from only two fingers against the wings, and each embodiment discloses a spring return for self-closing the valves. Each of the several embodiments disclose a different type of spring for self-closing.

DESCRIPTION OF THE FIGURES

In the drawings which illustrate several embodiments of the invention.

DETAILED DESCRIPTION

Each of the several embodiments described herein include a tab or wing radially extending from the side of the housing, a coaxial barrel open at its inner end and closed at its outer end and supporting a radial flange or wing which, in cooperation with the housing wing, facilitates the opening of the valve with opposing forces with only two fingers. Each embodiment includes a spring-operated self-closing feature which operates to rotate the inner barrel with respect to the outer housing to thereby stop the flow of fluid through openings in both the barrel and the housing, which openings are aligned during dispensing of the fluid. Each embodiment is illustrated as having a flange section on the inner end of the housing and in a plane normal to the longitudinal axis of the housing. Such a flange is particularly suitable for welding or otherwise attaching the dispensing valve to a flexible laminated plastic film fluid container or to more rigid surfaces. If desired, the various valve embodiments may be constructed with different means for mounting to a fluid container such as, for example, the flange may be replaced with a female screw-type connector for attachment to threaded bottles, or it may be replaced with a cork or plug-type connector for unthreaded jugs or the like.

Figure 1:
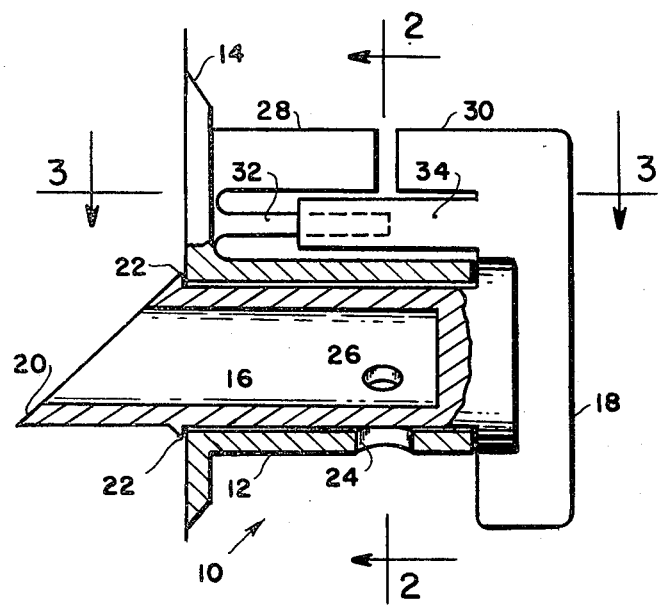
FIG. 1 is a sectional elevation view of a dispensing valve with a fluid bag-piercing end and a leaf spring for valve self-closure.

FIG. 1 is a sectional elevation view illustrating a preferred embodiment of a fluid dispensing valve 10 having a tubular housing 12, the inner end of which is connected to a flange 14 and the outer end of which is open. Inserted through the open end of the housing 12 is a tubular barrel 16 which is closed at its outer end and supports a radially positioned flat, paddle-like handle 18. In the embodiment illustrated, the inner end of the barrel 16 is diagonally formed to provide a sharp pointed tip 20 such as described and claimed in copending application Ser. No. 141,068, filed Apr. 17, 1980. Thus, when the barrel 16 is inserted through the tubular housing 12, the pointed tip 20 may pierce a plastic fluid-sealing diaphragm that may form a section of the surface of the plastic fluid container bag to which the flange 14 is attached. In this embodiment, the barrel may be locked into position by small tabs 22 which latch over the inner end of the housing 12 when the barrel 16 is fully inserted into the housing. A radial opening 24 is provided in the bottom of the tubular housing 12 near its outer end and a similar fluid opening 26 is radially located in the side wall of the tubular barrel 16. Thus, when barrel 16 is rotated to the point where the openings 24 and 26 are aligned with each other, the fluid may flow through the bore of the barrel 16 and out of the aligned openings 24, 26.

The dispensing valve illustrated in FIG. 1 includes a rectangular tab or wing 28, one end of which is connected to the flange 14 and in a plane substantially parallel with the longitudinal axis of the housing 12. A similar wing 30 forms a part of the handle 18 and the wings 28 and 30 are so aligned with each other that opposing finger forces against the wings 28 and 30 will result in rotation of the barrel 16 within the housing 12 to thereby align the fluid openings 24 and 26.

Figure 3:
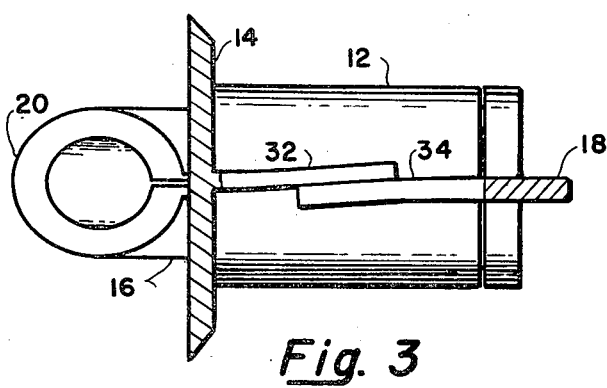
FIG. 3 is a top plan view taken along the lines 3—3 of FIG. 1.

The fluid dispensing valve 10 also includes a self-closing feature comprising a stout rectangular leaf spring 32, one end of which is connected to the flange 14. A second rectangular leaf spring 34 is connected to the handle 18. Springs 32 and 34 are so positioned and configured that a substantial portion of their side surfaces overlap and are in contact with each other as illustrated in FIGS. 1 and 3. In the preferred embodiment, the springs 32 and 34 underlie the wings 28 and 30 so that the wings may both protect the leaf springs and also protect the user from the possibility of being pinched by the action of the springs.

Figure 2:
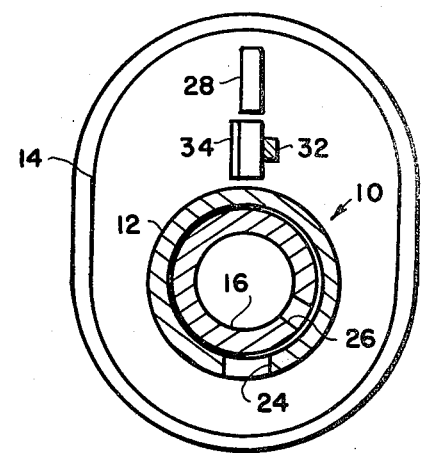
FIG. 2 is a sectional end view taken along the lines 2—2 of FIG. 1.

FIG. 2 is a sectional end view taken along the lines 2—2 of FIG. 1 and illustrate the normal offset of the openings 24 and 26 in the housing 12 and barrel 16. In use, a clockwise rotation of handle 18 of approximately 45° will cause the openings 24 and 26 to become aligned for dispensing fluid through the valve. The release of the wings 28 and 30 and therefore the handle 18 will permit the leaf springs 32 and 34 to return the barrel 16 to the normally off position.

Figure 5:
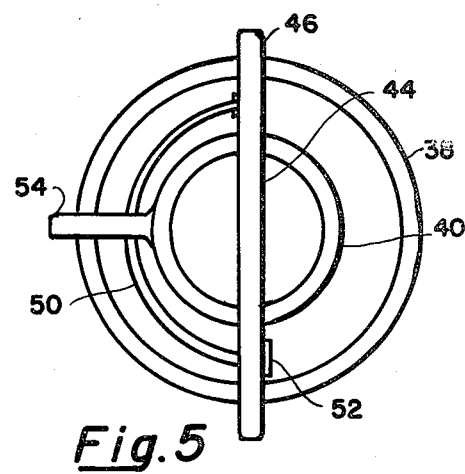
FIG. 5 is an end view taken along the lines 5—5 of FIG. 4.
Figure 4:
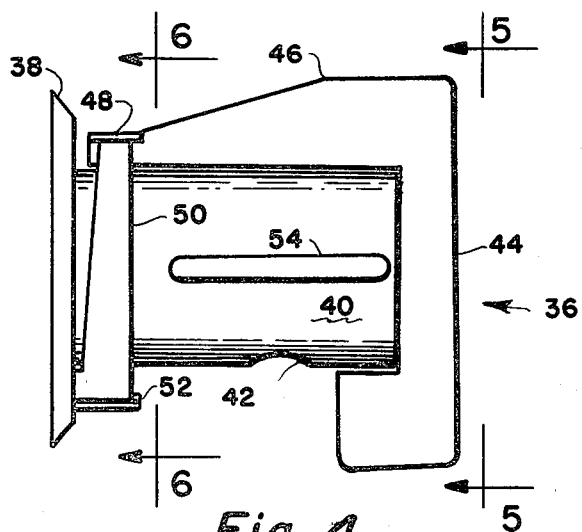
FIG. 4 is a side elevation view of another embodiment employing a curved spring for self-closure.
Figure 6:
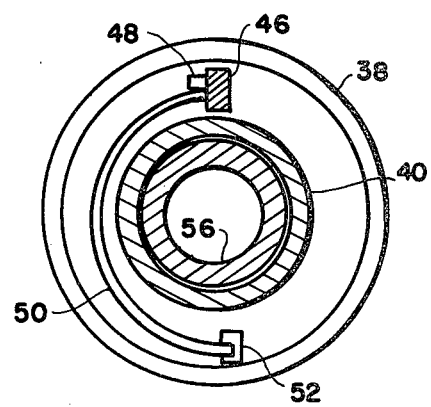
FIG. 6 is a sectional end view taken along the lines 6—6 of FIG. 4.

FIGS. 4 through 7 illustrate another embodiment of the invention which employs a curved leaf spring. FIG. 4 is a side elevation view of a dispensing valve 36 which, like the embodiment illustrated in FIG. 1, includes a flange 38 to which is connected a tubular housing 40 having a fluid opening 42 in the lower side wall near the open end of the housing. A barrel section (not shown), rotatable within the bore of the housing 12 is, as in FIG. 1, open on its either end while the closed outer end supports a handle 44. A long blade section 46 is attached to the handle 44 and overlies the outer top surface of the housing 40. The inner end of the blade 46 terminates at a point close to the surface of the flange 38 and contains an inverted "L" portion 48 which provides a socket for the end of a curved leaf spring 50, as best illustrated in FIG. 6. The opposite end of leaf spring 50 is embedded in a connecting member 52 which is attached to the flange 38. A radial wing 54 is attached to the exterior of the housing 40 in a plane parallel with the axis of the housing as illustrated in FIGS. 4 and 5. Thus, rotation of the barrel with respect to the housing may be effected by pinching the wings 46 and 54.

FIG. 6 is a sectional end view taken along the lines 6—6 of FIG. 4 and illustrates the curved leaf spring 50 in its position when the radial fluid opening 42 in the housing is not aligned with a corresponding fluid opening in the barrel contained therein.

Figure 7:
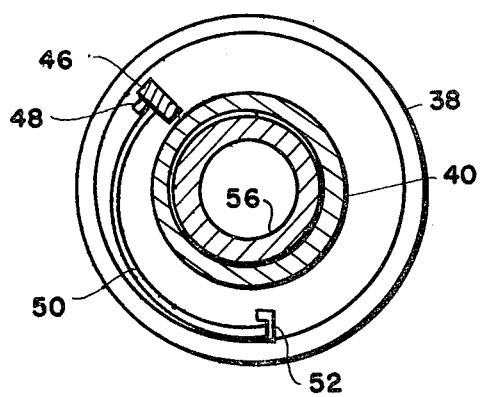
FIG. 7 is a sectional end view illustrating the open position of the valve illustrated in FIG. 6.

FIG. 7 is the same sectional end view but illustrates the extension of the curved leaf spring 50 when the fluid opening 42 in the housing 40 is aligned with the corresponding fluid opening in the barrel 56. In the embodiment illustrated it is assumed that such a counter-clockwise rotation of the barrel will align the fluid opening so that fluid may be dispensed. It will be understood, however, that the curved leaf spring 50 may be designed so that its normal position during closure of the valve may be that as illustrated in FIG. 7 and that a clockwise rotation of the handle and barrel to the position illustrated in FIG. 6 may effect coaxial alignment of the fluid dispensing openings in the barrel and housing.

Figure 8:
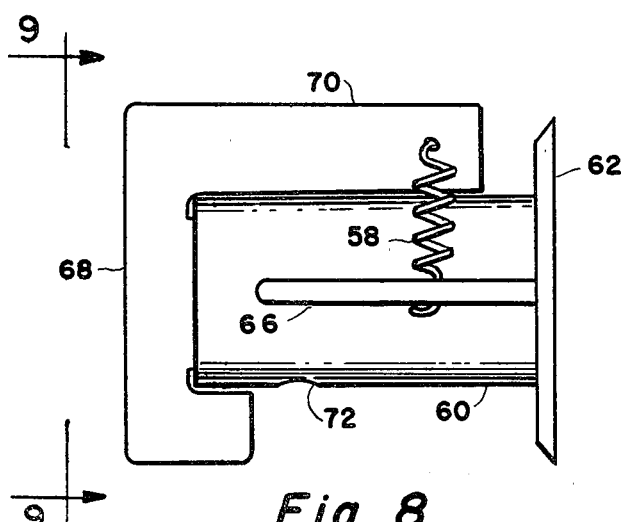
FIG. 8 is an elevation view of another embodiment of the valve employing a helical spring for self-closure of the valve.
Figure 9:
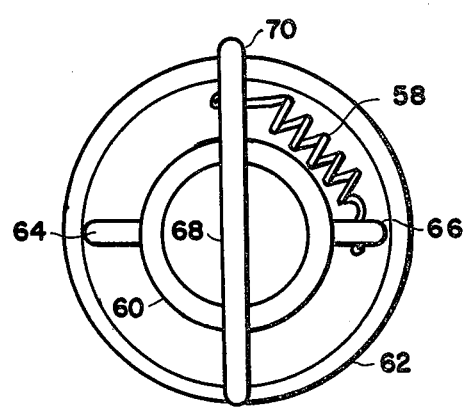
FIG. 9 is an end elevation view taken along the lines of 9—9 of FIG. 8.

FIGS. 8 and 9 illustrate another embodiment similar to the embodiment illustrated in FIGS. 4 through 7 but one in which the curved leaf spring of FIGS. 4 through 7 is replaced with a coil spring 58. In the embodiment illustrated in FIGS. 8 and 9, a tubular barrel 60 is attached at its inner end to a flange 62 and wing sections 64 and 66 on both sides of the housing 60 are attached to both the housing and the flange 62 as illustrated in FIGS. 8 and 9.

As with the previous embodiments, the housing 60 contains a tubular barrel (not shown), the closed end of which supports a handle 68. A long rectangular wing 70 is attached to the handle 68 and overlies and is spaced from the housing 60. The coil spring 58 is connected between the wing 70 and the wing 66 as illustrated in FIG. 9. In this embodiment, a counter-clockwise rotation for aligning the fluid dispensing opening 72 in the housing 60 with the corresponding opening in the barrel is effected by applying opposing finger forces which will pinch together the wings 64 and 70. Upon release of the finger forces against these wings, the spring 58 will return the handle and its attached barrel to the position illustrated in FIG. 9 to cut off further flow of fluid from the opening 72.

It will be understood that the spring 57 as illustrated in FIGS. 8 and 9 has been described as an extension spring which will "pull" the wings 66 and 70 together upon release of the opposite forces. If desired, the spring 58 may be a compression spring so that the fluid valve may be opened by opposing forces which tend to pinch together the wings 66 and 70 to thereby rotate the barrel in a clockwise direction within the housing 60.

Figure 10:
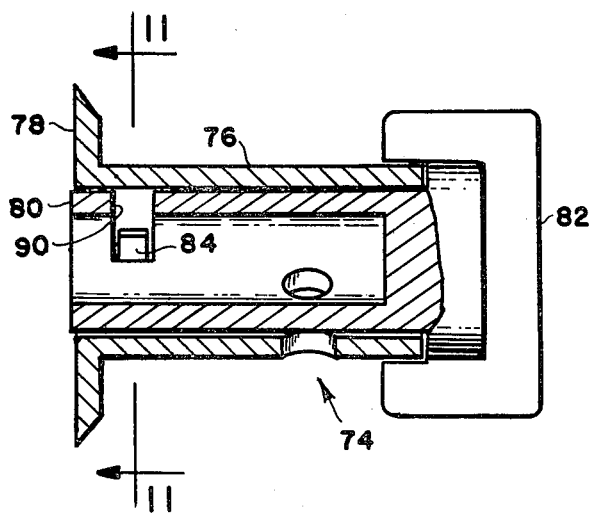
FIG. 10 is a sectional view of still another embodiment of the self-closing valve employing an internal leaf spring for self-closure of the valve.
Figure 11:
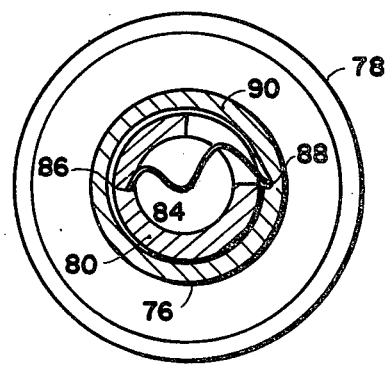
FIG. 11 is a sectional end view taken along the lines 11—11 of FIG. 10.

FIGS. 10 and 11 illustrates still another embodiment of a fluid dispensing valve 74 having a tubular housing 76 attached to a flange 78 and containing a tubular barrel 80 that is open on its inner end and the closed outer end supports a handle 82 positioned along the diameter of the barrel. The spring-return feature in the embodiment illustrated in FIGS. 10 and 11 is an internal leaf spring 84 that is arched across the bore of the barrel 80 substantially as illustrated in FIG. 11. Spring 84 is connected at one end to a notch or socket 86 in the internal wall of the barrel 80 and the opposite end of the spring 84 engages a notch 88 in the internal wall of the housing 76. An annular slot 90 in the wall of the barrel 80 is provided over an arc of approximately 90° to permit the barrel to be rotated within the housing 76 and yet permit the spring 84 to remain engaged in the notches 86 and 88. The spring 84 is preferably distorted with two or three bends as illustrated in FIG. 11. Clockwise rotation of the barrel 80 within the housing 76 will further distort the spring 84 so that when the handle 82 is released, the spring 84 will return the barrel to the closed position substantially as illustrated in FIG. 11. The embodiment illustrated in FIG. 10 also includes a wing (not shown) attached to the exterior side surface of the housing 76 in a configuration similar to the wings 64 and 66 in the embodiment illustrated in FIG. 9. Thus, finger pressure between the upper or lower sections of the handle 52 against either of the wings (not shown) will permit the valve to be opened against the action of the spring 84. Upon release of the handle, spring 84 will therefore return the valve to its closed position.

Figure 12:
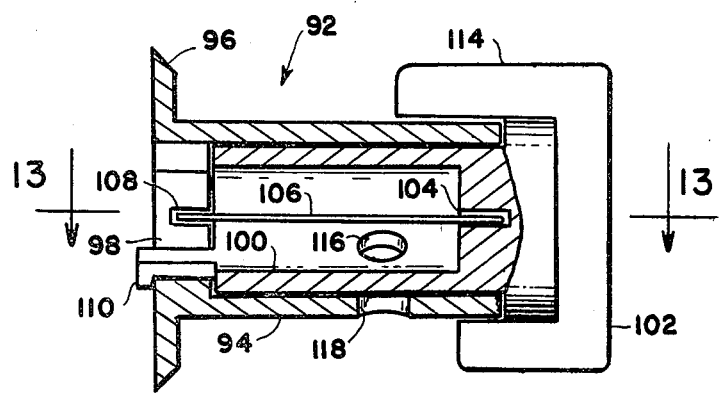
FIG. 12 is a sectional elevation view of still another embodiment of the valve employing a straight internal leaf spring for self-closure.
Figure 13:
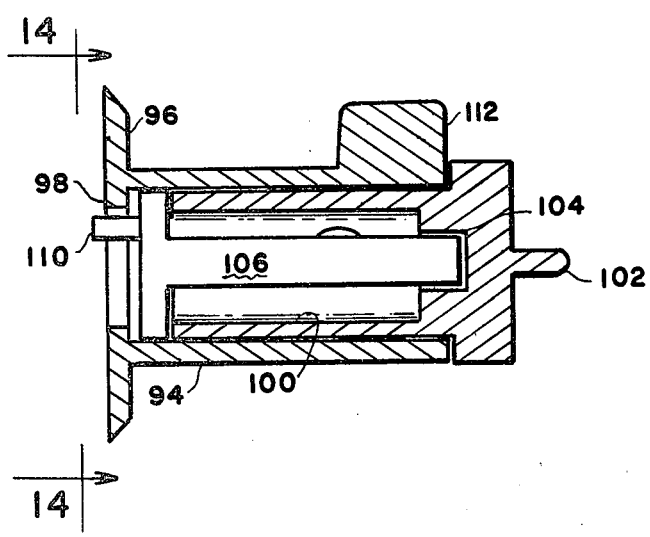
FIG. 13 is a sectional plan view taken along the lines 13—13 of FIG. 12.
Figure 14:
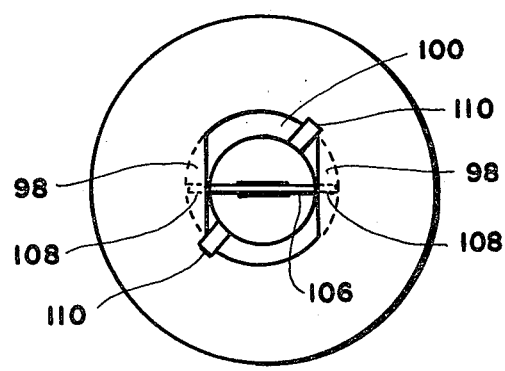
FIG. 14 is an end view taken along the lines 14—14 of FIG. 13.

FIGS. 12 through 14 illustrate still another embodiment of a fluid dispensing valve 92 which is similar to all the previously described embodiments except for an internal torsion spring which returns the valve to its off position. In the sectional and side elevational view illustrated in FIG. 12, a tubular housing 94 is attached to a flange 96. As illustrated in FIGS. 13 and 14, the opening through the flange 96 is not completely circular in that the opening through the housing contains solid vertical wall sections 98, the purpose of which are to restrain the torsional spring as will be subsequently explained. Located in the bore of the tubular housing 94 is a tubular barrel 100 which, as in the previous embodiments, is open at the inner end and the closed outer end is provided with a suitable diametrically positioned blade handle 102. The internal closed end of the barrel 100 is provided with a slot 104 across the diameter and at a depth of approximately one centimeter to support one end of a leaf spring 106. The opposite end of the leaf spring 106 is preferably formed in a T-shape with the length of the "T" section approximately equal to the internal diameter of the housing 94 as illustrated in FIG. 13. The "T" section of the spring 106 engages a slot 108 formed within the vertical wall sections 98 in the inside end of the housing 94. Thus, the leaf spring 106 is loosely suspended between slot 104 in the end of the barrel 100 and the slot 108 in the opposite end of the housing 94.

In the embodiment illustrated, a pair of latch bars 110 are formed in the inside end of the barrel 100 to retain the barrel within the housing 94 as best illustrated in FIGS. 12 and 14. As illustrated in FIG. 14, the latch bars also provide an open and closed rotational stop member for the barrel 100.

As illustrated in FIG. 13, the valve housing 94 includes a radial tab 112 which, in cooperation with a similar tab 114 attached to the handle 102 of FIG. 12, provides the means for one-handed operation of the valve. Therefore, by pinching together the wings 112 and 114, the barrel 100 will rotate within the housing 94 to align the fluid opening 116 in the barrel 100 with the opening 118 in the housing 94 to permit dispensing of fluid. Such a rotation will cause the leaf spring 106 to twist so that, upon release of the wings 112 and 114, the spring 106 will return to the closed valve position.

We claim:

1. A self-closing fluid dispensing valve comprising:
   a tubular housing having first and second open ends, said first end having a flange in a plane perpendicular to the longitudinal axis of said tubular housing for attaching and sealing said housing to the exterior wall of a fluid container, said housing having a fluid dispensing radial opening through the wall adjacent said second end;
   a tubular barrel coaxially rotatable within the bore of said tubular housing, said barrel having a first open end within said housing and a second closed end adjacent the second end of said housing, said closed end having attached thereto a manually operable handle for rotation of said barrel, said barrel having a fluid dispensing radial opening positioned for coaxial alignment with the radial opening in said housing; and
   resilient means within the bore of said tubular barrel said means having a first end coupled to said tubular housing and a second end coupled to said tubular barrel, said resilient means providing a rotational force for rotating said housing and said barrel to an off position where their respective fluid dispensing radial openings are not aligned.

2. The dispensing valve claimed in claim 1 wherein said resilient means is a leaf spring positioned within the bore of said barrel and substantially across the diameter of said barrel, the first end of said spring being coupled to a longitudinal slot in the bore of said barrel, said spring extending through an annular slot in the wall of said barrel, the second end of the spring engaging a longitudinal slot in the bore of said housing.

3. The dispensing valve claimed in claim 1 wherein said resilient means is a torsional spring longitudinally positioned in the bore of said barrel, the first end of said spring being connected to the closure in the closed second end of said barrel, the second end of said spring being connected to the bore of said housing at the first end thereof.

* * * * *